J. O. NODSLE.
AUTOMATIC VEHICLE BRAKE.
APPLICATION FILED AUG. 25, 1916.
1,289,881.
Patented Dec. 31, 1918.
2 SHEETS—SHEET 1.
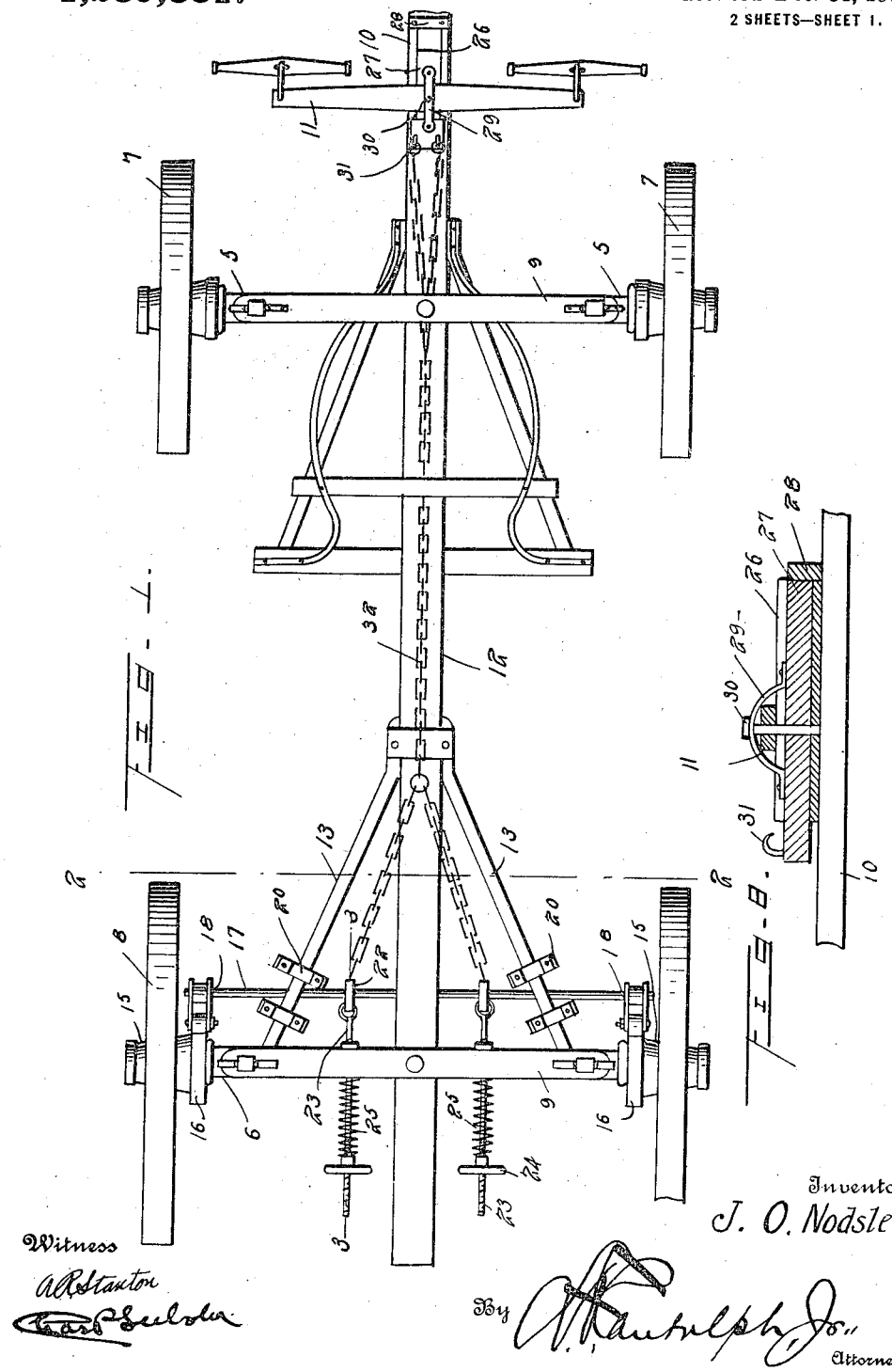
Witness
A. R. Stanton
Inventor
J. O. Nodsle
By 
Attorney J. O. NODSLE.
AUTOMATIC VEHICLE BRAKE.
APPLICATION FILED AUG. 25, 1916.
1,289,881.
Patented Dec. 31, 1918.
2 SHEETS—SHEET 2.
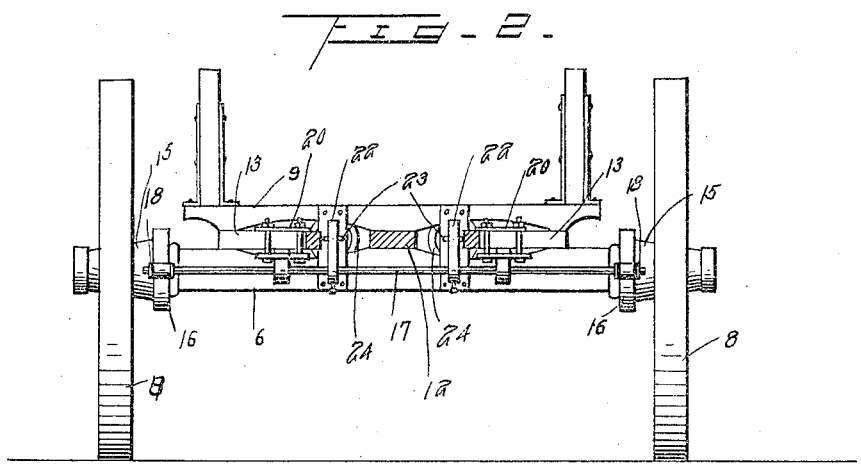
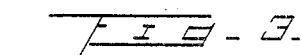
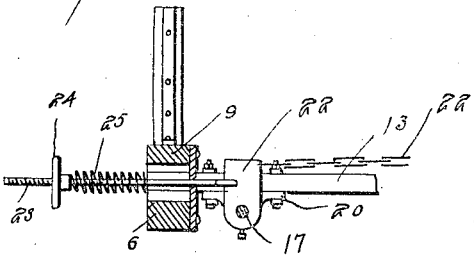
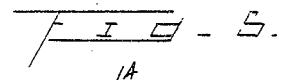
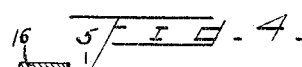
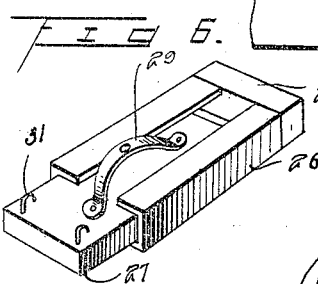
Inventor
J. O. Nodsle.
Witness

UNITED STATES PATENT OFFICE.

JOHN O. NODSLE, OF MAPLEWOOD, MINNESOTA.

AUTOMATIC VEHICLE-BRAKE.

1,289,881.  Specification of Letters Patent.  Patented Dec. 31, 1918.

Application filed August 25, 1916. Serial No. 116,819.

*To all whom it may concern:*

Be it known that I, JOHN O. NODSLE, a citizen of the United States, residing at Maplewood, in the county of Otter Tail and State of Minnesota, have invented certain new and useful Improvements in Automatic Vehicle-Brakes; and I do hereby declare the following to be a full, clear, and exact description of the invention, such as will enable others skilled in the art to which it appertains to make and use the same.

This invention relates to improvements in automatic wagon brakes, and has for its object to provide an improved brake in which the brake bands are automatically set by variable tensioning means.

Another object is the provision of an automatic brake embodying a novel type of connection between the brake bands and the double-tree, whereby the brake bands are expanded or released when a forward pull is exerted upon the double-tree.

With these and other objects in view, the invention consists in the novel construction, combination and arrangement of parts as will be hereinafter specifically described, claimed and illustrated in the accompanying drawings, in which:

Figure 1 represents a plan view of a wagon, showing the improved brake applied thereto, the body of the wagon being removed.

Fig. 2 represents a transverse sectional view on the line 2—2 of Fig. 1.

Fig. 3 represents a detail sectional view on the line 3—3 of Fig. 1,

Fig. 4 represents a fragmentary sectional view through the rear axle and hub of the rear wheel of the wagon, Fig. 5 represents a transverse sectional view on the line 5—5 of Fig. 4, Fig. 6 represents a perspective view of the double-tree supporting member detached.

Fig. 7 represents a perspective view of one of the arms of the brake operating shaft, Fig. 8 represents a detail sectional view through the double-tree supporting member and double-tree.

Referring to the drawing in detail, wherein similar reference numerals designate corresponding parts throughout the several views, the numerals 5 and 6 indicate the front and rear axles of a well known type of wagon upon which are rotatably secured the front and rear wheels 7 and 8, respectively. Bolsters 9 are secured upon the front and rear axles and a tongue 10 is connected with the front axle and provided with the usual double-tree 11. The front and rear axles are connected by the reach pole 12 and the reach pole is connected with the rear axle by the hounds 13.

In applying the improved automatic brake to the wagon a pair of rings 14 constituting brake drums are rigidly fastened to the hubs 15 of the rear wheels 8 and coöperate with the brake bands 16 which are of the contractible type. One end of each band 16 is rotatably secured upon one end of a shaft 17 and is confined between the free ends of a U-shaped member 18, which is rigidly fastened adjacent the end of the shaft 17. The opposite end of the brake band 16 is connected with the web 19 of the U-shaped member 18, whereby when the shaft is rotated in one direction the band 16 is contracted and moved into engagement with the ring 14, thereby retarding the rotary movement of the wheel.

The shaft 17 is rotatably supported in bearings 20 secured underneath the hounds 13, and the central portion of the shaft is provided with a pair of upstanding arms 22, which are connected with hooked forward ends of a pair of rods 23, the rear portions of which are externally screw threaded and provided with adjusting hand wheels 24. Expansion springs 25 are confined between the wheels 24 and the rear bolster 9 and normally tend to move the arms 22 rearwardly, thus rotating the shaft 17 in a direction to contract or set the brake bands 16.

A guide 26 is rigidly secured to the top of the tongue 10 and receives a longitudinally movable block 27, the forward movement of which is limited by a stop bar 28. A clip 29 is fastened upon the block 27 and receives the double-tree 11, which latter is secured in position in the clip by a bolt 30 extended through the clip 29 and the block 27.

The rear end of the block 27 is provided with hooks 31, which are connected by a chain or other flexible element 32 with the arms 22 of the shaft 17, whereby the latter is rotated when a forward pull is exerted upon the chain 32.

In operation, the forward pull exerted upon the double-tree 11 and block 27, incident to the pulling of the draft animals, is transmitted to the shaft 17 by the chain 32, thus moving the U-shaped members 18 at the ends of the shaft 17 into such position as to expand or release the brake bands 16, and permit free rotary movement of the wheels 8. However, when the pull upon the double-tree and block 27 is stopped, the shaft 17 is rotated by the springs 25, which draw the arms 22 rearwardly, thus contracting the bands 16 and frictionally engaging them with the rings 14, and consequently retarding the rotary movement of the rear wheels 8. It will be understood that the tension of the springs 25 may be varied by the hand wheels 24.

What I claim is:

In a wagon, running gear including rear wheels, bolsters therefor, a draft tongue, a double-tree, band brakes associated with the rear wheels, a shaft extending transversely of the running gear and operatively connected with the band brakes, a pair of spaced rods slidably carried by the bolster, upstanding arms keyed to the shaft, the inner ends of the sliding rods being pivotally secured to the upper ends of the arms, adjustable means carried by the rods, expansion coil springs carried by the rods and confined between said adjustable means and the bolster, and flexible means secured to the upper forward portion of the upstanding arms controlled by the double-tree for rocking said shaft against the tension of the springs, as and for the purpose specified.

In testimony whereof I affix my signature in presence of two witnesses.

JOHN O. NODSLE.

Witnesses:
  OL. H. NODSLE,
  Mrs. HUBERT EMERY.

Copies of this patent may be obtained for five cents each, by addressing the "Commissioner of Patents, Washington, D. C."